J. JAKEL.
HOP-PRESS.
No. 189,465. Patented April 10, 1877.
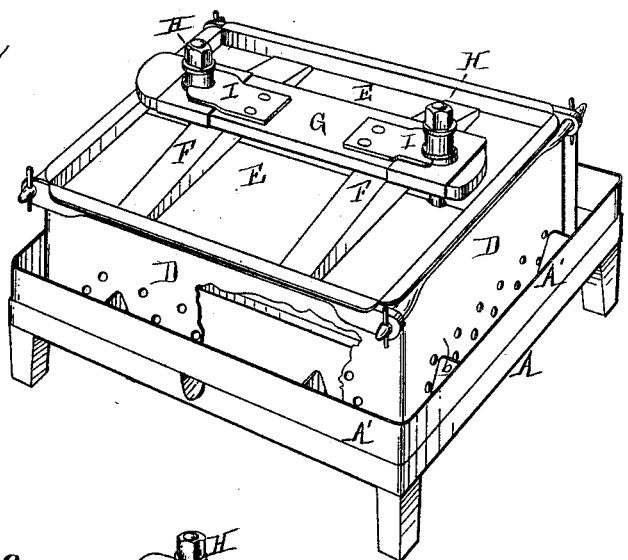
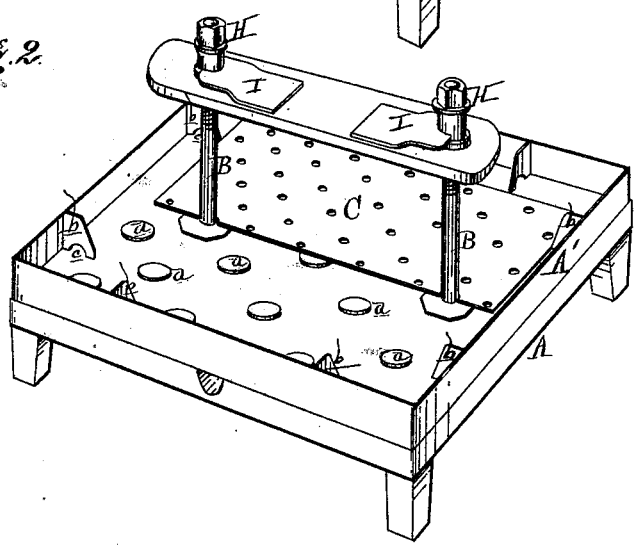

UNITED STATES PATENT OFFICE.

JOHN JAKEL, OF DETROIT, MICHIGAN, ASSIGNOR OF ONE-HALF HIS RIGHT TO F. LOUIS DOHNSTREICH, OF SAME PLACE.

IMPROVEMENT IN HOP-PRESSES.

Specification forming part of Letters Patent No. 189,465, dated April 10, 1877; application filed January 15, 1877.

*To all whom it may concern:*

Be it known that I, JOHN JAKEL, of Detroit, in the county of Wayne and State of Michigan, have invented a new and useful Improvement in Hop-Presses; and I do declare that the following is a true and accurate description thereof, reference being had to the accompanying drawings, and to the letters of reference marked thereon, and being a part of this specification.

Figure 1 is a perspective view, showing a cheese in place ready to be pressed. Fig. 2 is a perspective view of the standing portion of the press, with one section of the perforated false bottom removed.

The nature of this invention relates to an improvement in presses for the use of brewers' in extracting the liquid from hops after they have been boiled. It consists in the peculiar construction and arrangement of the various parts, as more fully hereinafter set forth.

In the drawing, A represents the base of the press, mounted upon any proper foundation, and is provided with the upwardly-projecting studs $a$, and is surrounded by a flange, A', upon its four sides, which, in turn, has inwardly-projecting flanges or studs $b$, which serve as braces to the bottom of the cheese-frame. Through the bottoms of these flanges $b$ are cut openings $c$, which form gutters or channels, through which the liquid expressed passes to the outlet $d$. Rising from the platform A are two screw threaded follower-guides, B. C is a perforated false bottom, preferably made in sections, as shown. D is a cheese box or frame, perforated as shown, constructed in sections, keyed at its four corners, so that it can be readily removed from around the mass or cheese when desired.

The false bottoms being in place, the frame D is then set up, into which the hops are thrown. On top of the mass are then placed the following-boards and cross-bars E F. The follower G is now slipped over the guides B, and the flanged nuts H are screwed upon the guides, the flanges of the nuts engaging with the straddlers I upon the top of the follower in such manner that the follower is depressed or retracted, according to the way the said nuts are rotated.

By the use of a press of this construction the brewer is enabled to save, on an average, two barrels of the extract, which has heretofore been thrown away, while the extract so expressed is very clear, and of much greater strength than that produced by the mere draining, and, consequently, a saving is made in the quantity of hops used.

The false bottom rests upon the studs $a$, which forms a space between the false bottom and the bottom proper, through which such portion of the liquid as is forced through the false bottom runs in passing to the outlet.

What I claim as my invention is—

1. In a press constructed substantially as described, the studs $a$, by which the perforated bottom is elevated above the bottom proper, in combination with the perforated bottom, and with the guttered flanges $b$, substantially as set forth.

2. In a press, the combination of the base A, studs $a$, flanges A' and $b$, gutters $c$, outlet $d$, follower-guides B, perforated bottom C, box or frame D, follower-boards E, and cross-bars F, and follower G, flanged nuts H, and straddler I, arranged to operate substantially as and for the purposes set forth.

JOHN JAKEL.

Witnesses:
H. S. SPRAGUE,
R. H. COMBS.